US012657793B2

(12) United States Patent
    Pang et al.

(10) Patent No.:     US 12,657,793 B2
(45) Date of Patent:        Jun. 16, 2026

(54) BACKGROUND IMAGE GENERATION METHOD AND APPARATUS, ELECTRONIC DEVICE AND STORAGE MEDIUM

(71) Applicant: Beijing Zitiao Network Technology Co., Ltd., Beijing (CN)

(72) Inventors: Yu Pang, Beijing (CN); Yuting Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 197 days.

(21) Appl. No.: 18/574,301

(22) PCT Filed: Jul. 20, 2022

(86) PCT No.: PCT/CN2022/106663
    § 371 (c)(1),
    (2) Date: Dec. 26, 2023

(87) PCT Pub. No.: WO2023/011176
    PCT Pub. Date: Feb. 9, 2023

(65)            Prior Publication Data
    US 2024/0331238 A1       Oct. 3, 2024

(30)         Foreign Application Priority Data
    Aug. 5, 2021      (CN) .......................... 202110898726.1

(51) Int. Cl.
    *G06T 11/60*          (2026.01)
    *G06F 9/451*          (2018.01)
(52) U.S. Cl.
    CPC .............. *G06T 11/60* (2013.01); *G06F 9/451* (2018.02); *G06T 2210/22* (2013.01)

(58) Field of Classification Search
    CPC ...... G06T 11/60; G06T 2210/22; G06F 9/451
    See application file for complete search history.

(56)              References Cited
                U.S. PATENT DOCUMENTS 11,789,677 B2 *  10/2023  Asai ...................... G06F 3/1292
                                                        455/41.3
    2008/0234007 A1    9/2008  Lee et al.
                    (Continued)

FOREIGN PATENT DOCUMENTS

CN         104090979 A     10/2014
    CN         104426896 A      3/2015
                    (Continued)

OTHER PUBLICATIONS

International Patent Application No. PCT/CN2022/106663; Int'l Written Opinion and Search Report; dated Oct. 10, 2022; 7 pages.
                    (Continued)

*Primary Examiner* — Jin Cheng Wang
(74) *Attorney, Agent, or Firm* — BakerHostetler

(57)              ABSTRACT

Disclosed are a background image generation method and apparatus, an electronic device and a storage medium. The background image generation method comprises: displaying a background image preview effect of a preset page, wherein the background image preview effect is displayed on a first terminal, and the background image preview effect is a preview effect of displaying a background image on a second terminal; receiving a background image generation operation; and in response to the background image generation operation, generating a background image if the preset page is displayed on the second terminal.

17 Claims, 8 Drawing Sheets

(56)                References Cited

U.S. PATENT DOCUMENTS

| | | | | |
|---|---|---|---|---|
| 2012/0026541 | A1* | 2/2012 | Kobayashi | G06F 3/1284 |
| | | | | 358/1.15 |
| 2018/0121065 | A1* | 5/2018 | Seo | G06F 9/451 |
| 2020/0174646 | A1* | 6/2020 | Park | G06F 3/0486 |
| 2020/0389578 | A1* | 12/2020 | Lee | H04M 1/0268 |
| 2021/0005223 | A1* | 1/2021 | Wang | G06F 3/0482 |
| 2021/0216267 | A1* | 7/2021 | Lu | G06V 20/10 |
| 2022/0150345 | A1* | 5/2022 | Woo | H04N 23/53 |
| 2022/0207645 | A1* | 6/2022 | Kansara | H04N 7/0122 |
| 2022/0229624 | A1* | 7/2022 | Xiong | G06F 3/04817 |
| 2022/0292748 | A1* | 9/2022 | Benaim | H04N 21/234336 |
| 2023/0036950 | A1* | 2/2023 | Saa-Garriga | G09G 5/005 |

FOREIGN PATENT DOCUMENTS

| | | | |
|---|---|---|---|
| CN | 303805506 | S | 8/2016 |
| CN | 108228249 | A | 6/2018 |
| CN | 110716775 | A | 1/2020 |
| CN | 111782100 | A | 10/2020 |
| CN | 112507273 | A | 3/2021 |
| CN | 113535315 | A | 10/2021 |
| CN | 307108010 | S | 2/2022 |

OTHER PUBLICATIONS

"Can content on computer, PAD, phone end respectively?"; https://www.linked-e.com/id6898276.html; Jun. 2018; accessed Oct. 21, 2022; 25 pages (*contains English Translation*).

* cited by examiner

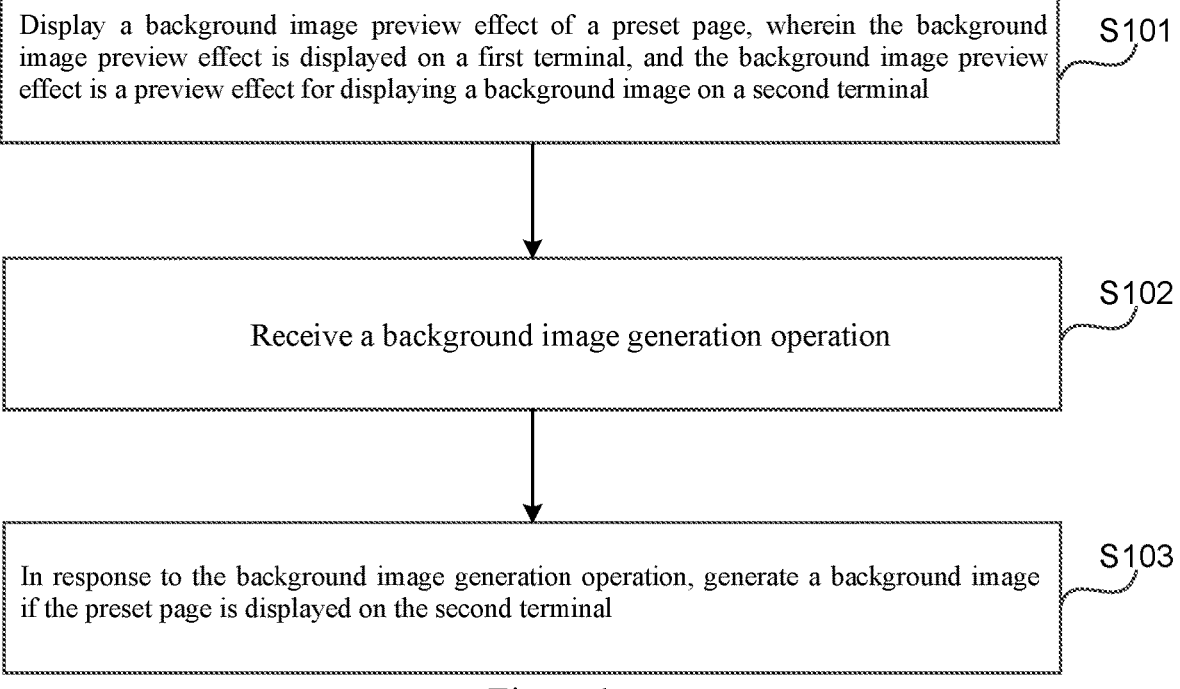

Display a background image preview effect of a preset page, wherein the background image preview effect is displayed on a first terminal, and the background image preview effect is a preview effect for displaying a background image on a second terminal          S101

Receive a background image generation operation          S102

In response to the background image generation operation, generate a background image if the preset page is displayed on the second terminal          S103

Figure 1

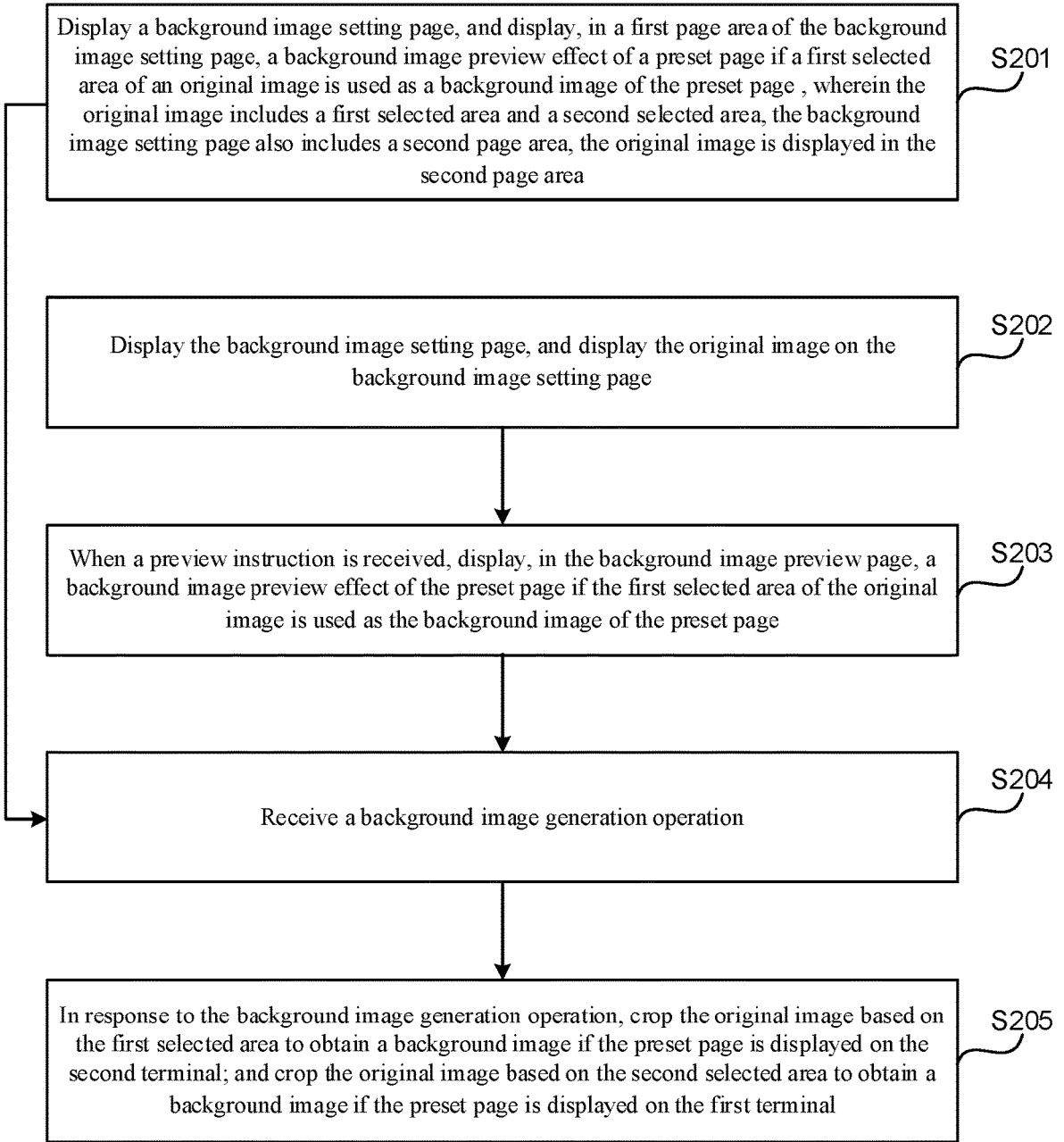

Display a background image setting page, and display, in a first page area of the background image setting page, a background image preview effect of a preset page if a first selected area of an original image is used as a background image of the preset page , wherein the original image includes a first selected area and a second selected area, the background image setting page also includes a second page area, the original image is displayed in the second page area                                                      S201

Display the background image setting page, and display the original image on the background image setting page                                                      S202

When a preview instruction is received, display, in the background image preview page, a background image preview effect of the preset page if the first selected area of the original image is used as the background image of the preset page                                                      S203

Receive a background image generation operation                                                      S204

In response to the background image generation operation, crop the original image based on the first selected area to obtain a background image if the preset page is displayed on the second terminal; and crop the original image based on the second selected area to obtain a background image if the preset page is displayed on the first terminal                                                      S205

BACKGROUND IMAGE GENERATION METHOD AND APPARATUS, ELECTRONIC DEVICE AND STORAGE MEDIUM

CROSS-REFERENCE TO RELATED APPLICATIONS

This application is a national phase application of International Application No. PCT/CN2022/106663, filed on Jul. 20, 2022, which claims priority to Chinese patent application No. 202110898726.1 filed on Aug. 5, 2021, with the Chinese Patent Office, the entire content both of which are incorporated into this application by reference in their entireties.

TECHNICAL FIELD

The present disclosure relates to the field of computer technology, for example, to a background image generation method, apparatus, electronic device, and storage medium.

BACKGROUND

A user can set a background image for a page as desired. For example, the user can select an image in different terminals separately as a background image if the user's personal homepage is displayed in that terminal.

However, setting a background image by employing methods for setting a background image in related arts has a relatively complicated setting process and cannot meet the diverse needs of users.

SUMMARY

The present disclosure provides a background image generation method, apparatus, electronic device, and storage medium, to simplify the process for setting a background image.

The present disclosure provides a background image generation method, comprising:

displaying a background image preview effect of a preset page, wherein the background image preview effect is displayed on a first terminal, and the background image preview effect is a preview effect for displaying a background image on a second terminal;

receiving a background image generation operation;

generating a background image if the preset page is displayed on the second terminal in response to the background image generation operation.

The present disclosure further provides a background image generation apparatus, comprising:

a preview module configured to display a background image preview effect of a preset page, wherein the background image preview effect is displayed on a first terminal, and the background image preview effect is a preview effect for displaying a background image on a second terminal;

a generation operation receiving module, configured to receive a background image generation operation;

a background image generation module, configured to generate a background image if the preset page is displayed on the second terminal in response to the background image generation operation.

The present disclosure further provides an electronic device, comprising:

one or more processors;

a memory, configured to store one or more programs;

when executed by the one or more processors, the one or more programs cause the one or more processors to implement the background image generation method as described above.

The present disclosure further provides a computer-readable storage medium having a computer program stored thereon, which, when executed by a processor, implements the background image generation method as described above.

BRIEF DESCRIPTION OF THE DRAWINGS

FIG. 1 is a schematic flowchart of a background image generation method provided by an embodiment of the present disclosure;

FIG. 6 is a schematic flowchart of another background image generation method provided by an embodiment of the present disclosure;

DETAILED DESCRIPTION

Figure 2:
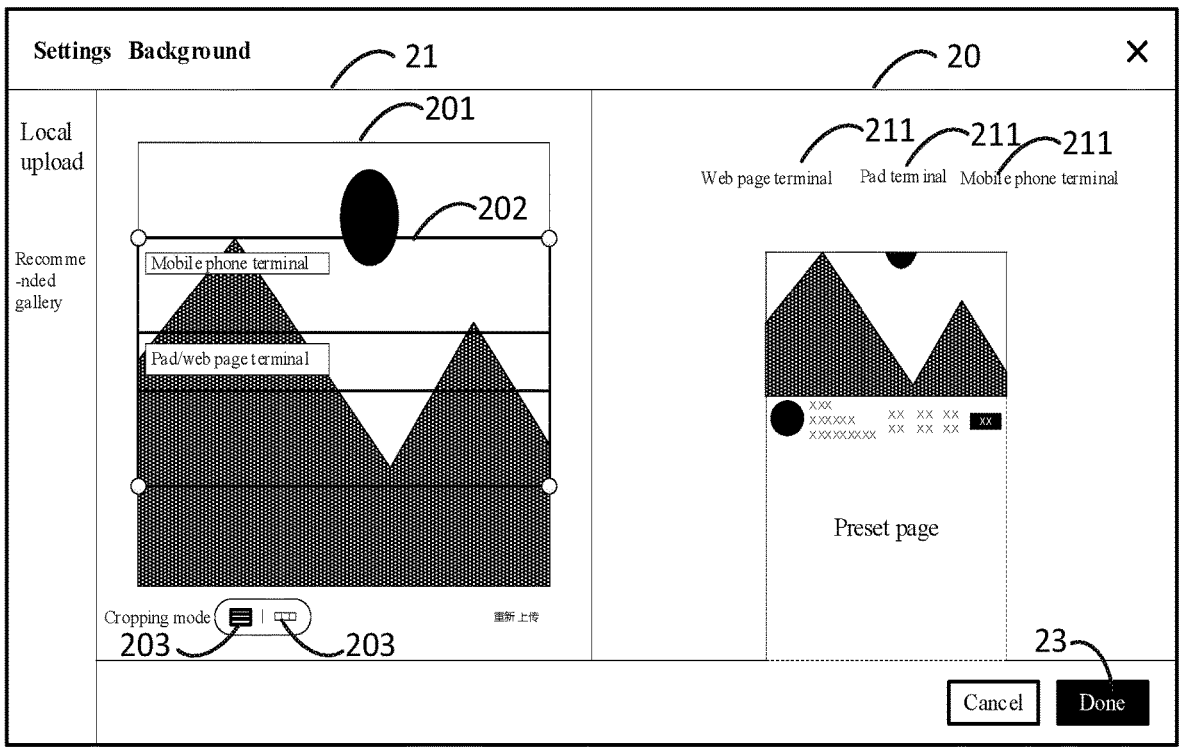
FIG. 2 is a schematic diagram of a background image setting page provided by an embodiment of the present disclosure.

Embodiments of the present disclosure will be described below with reference to the accompanying drawings. Although some embodiments of the disclosure are shown in the drawings, the disclosure can be embodied in various forms and these embodiments are provided for the understanding of the disclosure. The drawings and embodiments of the present disclosure are for illustrative purposes only.

Various steps recited in the method implementations of the present disclosure can be executed in a different order, and/or executed in parallel. In addition, the method implementations can include additional steps and/or omit to perform illustrated steps. The scope of the present disclosure is not limited in this respect.

The term "including" and its variants as used herein are open ended "including", that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

Concepts such as "first" and "second" mentioned in the present disclosure are only used to distinguish between different apparatus, modules or units, and are not used to limit the order of functions performed by these apparatus, modules or units or their interdependence.

The modifiers of "one" and "a plurality of" mentioned in the present disclosure are illustrative and not restrictive, and those skilled in the art should understand that they should be construed as "one or more" unless the context clearly indicates otherwise.

The names of messages or information exchanged between a plurality of apparatus in the implementations of the present disclosure are only used for illustration, and are not used to limit the scope of these messages or information.

FIG. 1 is a schematic flowchart of a background image generation method provided by an embodiment of the present disclosure. The method can be executed by a background image generation apparatus, wherein the apparatus can be implemented by software and/or hardware and can be configured in an electronic device. For example, the apparatus can be configured in a mobile phone, a tablet or a computer. The background image generation method provided by the embodiment of the present disclosure is suitable for the scenario of generating a background image if a preset page is displayed on other terminals. As shown in FIG. 1, the background image generation method provided in this embodiment can include:

S101. displaying a background image preview effect of a preset page, wherein the background image preview effect is displayed on a first terminal, and the background image preview effect is a preview effect for displaying a background image on a second terminal.

The preset page can be a page that is provided in advance, for example, a personal homepage of a user of the A video application. A background image preview effect of the preset page can be understood as a preview effect for the background image of the preset page if it is displayed on the second terminal. The background image can be displayed in a set position in the preset page (such as in full page or an area in the page) in the form of page background. The first terminal can be a terminal that executes the background image generation method provided in this embodiment. The second terminal can be other terminals different than the first terminal, and the number thereof can be one or more. The first terminal and the second terminal can be different types of terminals, which can include computer terminals (such as web terminals), tablet terminals (i.e., Pad terminals), mobile phone terminals, etc. Accordingly, when the first terminal is a computer terminal, the second terminal can be terminals such as Pad terminals and/or mobile phone terminals; when the first terminal is a Pad terminal, the second terminal can be terminals such as computer terminals and/or mobile phone terminals; when the first terminal is a mobile phone terminal, the second terminal can be terminals such as computer terminals and/or Pad terminals.

The first terminal can display the preview effect of the background image of the preset page if it is displayed on the second terminal, for example, acquire page layout information if the preset page is displayed on the second terminal, build a preview image for the preset page if it is displayed on the second terminal based on the page layout information and background image information of the preset page (for example, original background image information if the preset page is displayed on the second terminal before the current setting by the user or current background image information as set by the user), and display the preview image. For example, a preview image of a background image of a personal homepage corresponding to the A video application on a computer terminal can be displayed on a mobile phone terminal.

In one implementation, the displaying a background image preview effect of a preset page comprises: displaying a background image preview effect of the preset page if a first selected area of an original image is used as a background image of the preset page.

The original image can be an image that the user wants to use to generate a background image, for example, a local image imported by the user or an image selected by the user in the gallery. When displayed, the original image can include at least one selected area, for example, a first selected area, and can also include other selected areas (such as a second selected area corresponding to the first terminal), each selected area can be an image area located in respective selecting box, and different selected areas correspond to different terminals. Accordingly, the preview effect of one selected area of the original image can be the preview effect when the preset page is displayed in a terminal corresponding to the selected area, if the selected area is used as the background image of the preset page.

Exemplarily, when a user wants to set, on a first terminal, a background image of a preset page if it is displayed on a second terminal, the user can import or select an original image to be used to generate the background image of the preset page. Accordingly, after detecting that the user has uploaded or selected the original image, the first terminal can determine a first selected area of the original image based on default determination rules or setting operations by the user on the selected area, and display the preview effect when the preset page is displayed on the second terminal, if the first selected area is used as the background image of the preset page.

In this embodiment, after the user imports or selects the original image, the first terminal can also display the original image for the user to view or adjust the selected area in the original image. At this time, the first terminal can simultaneously display the original image and the preview effect of the selected area of the original image. It is also possible to display the original image and the preview effect of the selected area in the original image at different times. For example, the original image can be displayed first, and then the preview effect of the selected area in the original image can be displayed. For example, the original image is displayed first for the user to set the selected area in the original image, and then, after the setting by the user is completed, the preview effect of the selected area set by the user is displayed; or, the preview effect of the selected area in the original image is displayed first, and then the original image is displayed, for example, the preview effect of a default selected area in the original image is displayed first, and when the user is not satisfied with the default selected area, the original image is displayed so that the user can adjust the selected area in the original image. This is not limited in this embodiment.

Figure 4:
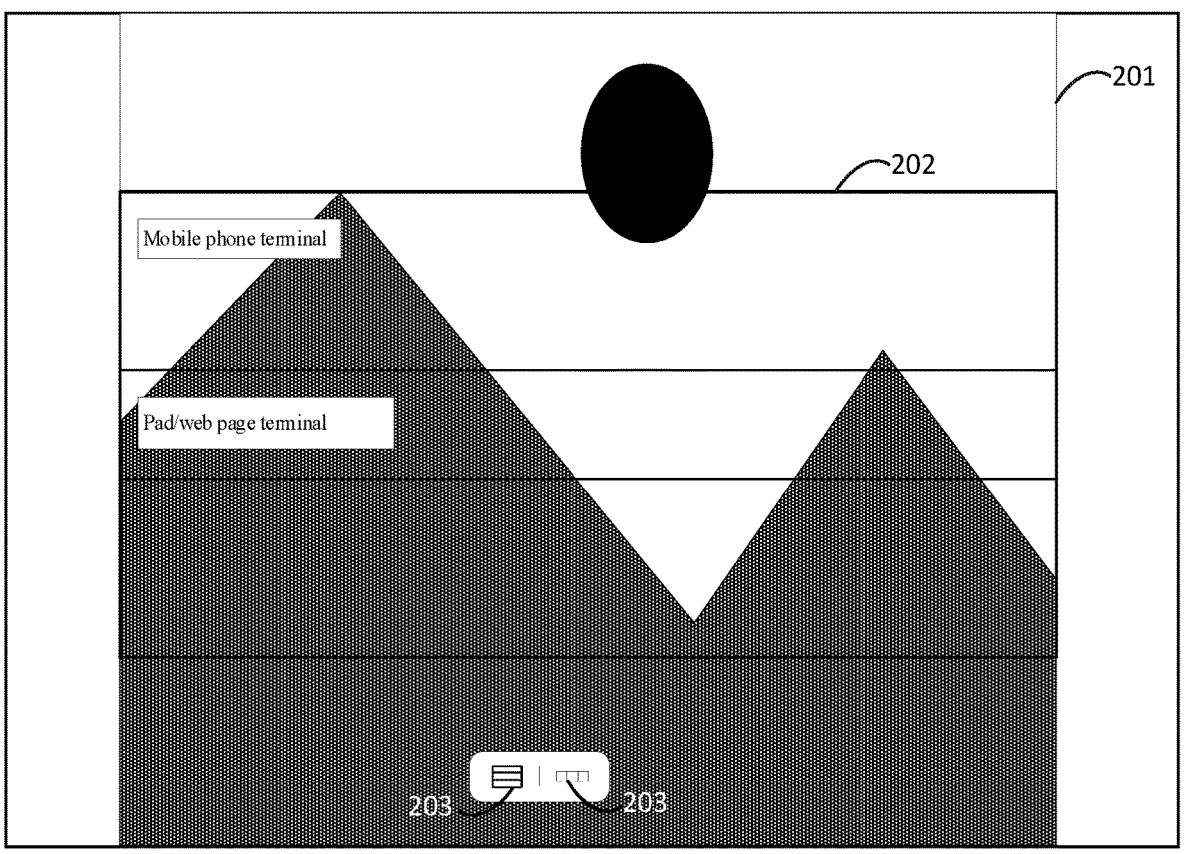
FIG. 4 is a schematic diagram of another background image setting page provided by an embodiment of the present disclosure.
Figure 5:
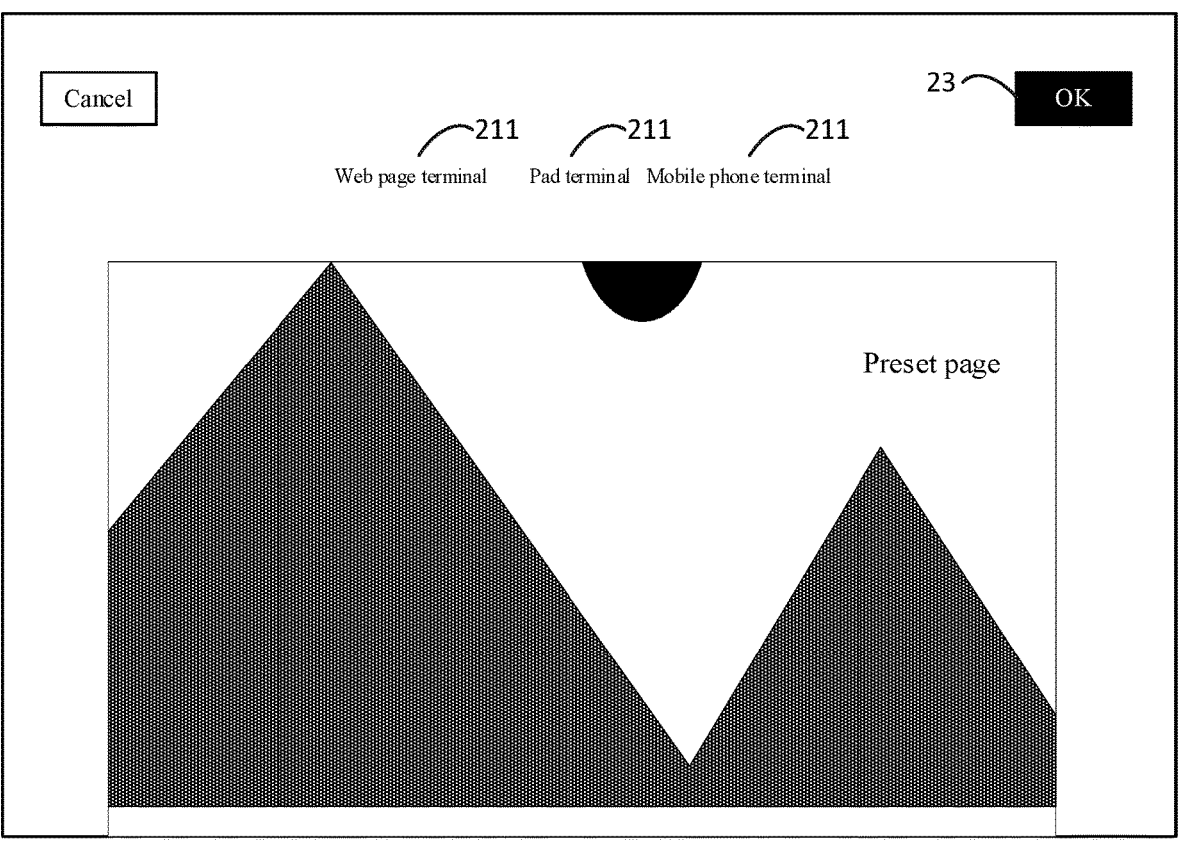
FIG. 5 is a schematic diagram of a preview page provided by an embodiment of the present disclosure.

Considering the clarity for displaying the original image 201 and the preview effect of the selected area in the original image 201 and the convenience for the user to view the original image 201 and the preview effect of the selected area in the original image 201, in some embodiments, when the first terminal is a computer terminal, that is, when the user sets, on the computer terminal, a background image when a preset page is displayed on other terminals, the first terminal can simultaneously display the original image 201 and the preview effect of the selected area (for example, a first selected area) of the original image 201. A background image editing area and a background image preview area are displayed simultaneously on the background image setting page on the computer terminal. After the source image of the background image is selected, the source image is displayed in the background image editing area as the image to be edited, and there are multiple editing boxes displayed on the image to be edited, such as an editing box corresponding to the background image on a Pad, an editing box corresponding to the background image on a mobile phone, etc. The image area selected in the editing box is used as the image area for the final generated background image, as shown in FIG. 2; when the first terminal is a Pad terminal or a mobile phone terminal, that is, when the user sets, on a Pad terminal or a mobile phone terminal, the background image if the preset page is displayed on other terminals, the first terminal may not display the original image 201 and the preview effect of the selected area of the original image 201 at the same time. For example, the original image 201 and the preview effect of the selected area of the original image 201 can be displayed on different pages, as shown in FIG. 4 and FIG. 5. As shown in FIG. 4, on the background image setting page on the Pad terminal, there is displayed a background image editing area. The source image is displayed in the background image editing area as the image to be edited. Multiple editing boxes are presented on the image to be edited, for example, an editing box corresponding to the background image on the Pad terminal, an editing box corresponding to the background image on a mobile phone terminal, etc. The image area selected in the editing box is used as the image area of the finally generated background image. For example, when the editing is not triggerred by the user after a preset period of time, the background image setting page is switched to the background image preview page as shown in FIG. 5. On the background image preview page, identifications such as a Pad terminal, a mobile phone terminal, etc. on the page can be triggered to switch to preview background image effects at different terminals. In addition, when the user triggers the background image in FIG. 5, such as long presses or drags the background image, it can switch to the background image setting page as shown in FIG. 4, and the editing box can be adjusted to adjust the background image.

S102. receiving a background image generation operation.

The background image generation operation can be a trigger operation to generate a background image, such as an operation to trigger an image generation control. The background image generation operation can be used to instruct the first terminal to generate a background image if a preset page is displayed on one or more other terminals (i.e., the second terminals).

As shown in FIG. 2 or FIG. 5, when the user wants to generate a background image if a preset page is displayed on the second terminal, the user can trigger the image generation control 23. Accordingly, when detecting that the user triggers the image generation control 23, the first terminal can determine that the background image generation operation is received.

S103. In response to the background image generation operation, generating a background image if the preset page is displayed on the second terminal.

When receiving the background image generation operation, the first terminal can generate a background image if the preset page is displayed on the second terminal based on background image information corresponding to the displayed background image preview effect, for example, crop an original image selected or imported by the user based on a first selected area in the original image corresponding to the second terminal, and use the cropped image corresponding to the first selected area as the background image if the preset page is displayed on the second terminal.

In addition, after obtaining the background image if the preset page is displayed on a terminal (for example, the first terminal or the second terminal), the first terminal can also send the generated background image and a terminal identification of the terminal corresponding to the background image to a server for storage. Therefore, when the terminal receives a trigger operation to display the preset page, it can obtain the background image if the preset page is displayed on itself from the server according to its own terminal identification, and display a preset page using the background image as a page background.

In this embodiment, the user can view, in a terminal, the preview effect of the background image of the preset page if it is displayed on other terminals and set the background image if the preset page is displayed on other terminals. There is no need for the user to use the same image as the background image of the preset page in multiple terminals uniformly, and there is no need for the user to set, on each terminal, the background image of the preset page if it is displayed on that terminal separately, which enables to implement cross-platform preview and setting of the background image, simplify operations required to set the background image, and improve the display effect of the set background image.

The background image generation method provided by this embodiment displays a background image preview effect of a preset page, wherein the background image preview effect is displayed on a first terminal, and the background image preview effect is a preview effect for displaying a background image on a second terminal; receives a background image generation operation; in response to the background image generation operation, generates a background image if the preset page is displayed on the second terminal. By adopting the above technical solution, the embodiment can view, in the first terminal, the preview effect of the background image of the preset page if it is displayed on the second terminal, and generate the background image of the preset page if it is displayed on the second terminal, which can simplify the background image setting process and improve the display effect of the background image.

FIG. 6 is a schematic flowchart of another background image generation method provided by an embodiment of the present disclosure. The solutions in this embodiment can be combined with one or more solutions in the above embodiments. The original image also includes a second selected area, and the generating a background image if the preset page is displayed on the second terminal comprises: cropping the original image based on the first selected area to obtain the background image if the preset page is displayed on the second terminal; the method further comprises: cropping the original image based on the second selected area to obtain the background image if the preset page is displayed on the first terminal.

In one embodiment, the displaying a background image preview effect of the preset page if a first selected area of the original image is used as the background image of the preset page, comprises: displaying a background image setting page, and displaying, in a first page area of the background image setting page, the background image preview effect of the preset page if the first selected area of the original image is used as the background image of the preset page, wherein the background image setting page also includes a second page area, and the original image is displayed in the second page area.

In one embodiment, the displaying a background image preview effect of the preset page if a first selected area of the original image is used as the background image of the preset page, comprises: when a preview instruction is received, displaying, on a background image preview page, the background image preview effect of the preset page if the first selected area of the original image is used as the background image of the preset page; the method further comprises: displaying the background image setting page, and displaying the original image on the background image setting page.

Accordingly, as shown in FIG. 6, the background image generation method provided in this embodiment can comprise:

S201. Displaying a background image setting page, and displaying, in a first page area of the background image setting page, a background image preview effect of a preset page when a first selected area of an original image is used as a background image of the preset page, wherein the original image includes a first selected area and a second selected area, the background image setting page also includes a second page area, the original image is displayed in the second page area, and the background image preview effect is a preview effect of displaying a background image on a second terminal.

The first selected area can be a selected area corresponding to the second terminal. The second selected area can be a selected area corresponding to the first terminal. The number of the second terminals can be one or more. Accordingly, at least one of the second selected areas can be set in one-to-one correspondence with at least one of the second terminals. Two selected areas (including the first selected area and the second selected area) can be the same or different areas, and the multiple selected areas include at least two selected areas with different positions and/or sizes. The background image setting page can be a page for the user to set a background image if a preset page is displayed on a local terminal (i.e., the first terminal) and/or other terminals. The page can include two areas, namely, a first page area and a second page area. The first page area (i.e., the background image preview area) can be an area in the background image setting page for displaying a preview effect of the selected area. The second page area (i.e., the background image editing area) can be an area in the background image setting page for displaying the original image imported by the user.

In this embodiment, the original image and the preview effect of the selected area in the original image can be displayed on the same page (such as the background image setting page).

Exemplarily, as shown in FIG. 2 (the figure takes displaying a preview effect of a selected area in the first page area 20 as an example), the background image setting page can include the first page area 20 and the second page area 21, so that, when the user imports or selects the original image 201, the first terminal can display the original image 201 imported or selected by the user in the second page area 21 of the background image setting page, and display selecting boxes 202 corresponding to different terminals (such as web page terminal, Pad terminal, and mobile phone terminal) on the upper layer of the original image 201 to identify selected areas in the original image 201 corresponding to different terminals; and, display the preview effect of the selected area of the original image 201 in the first page area 20 of the background image setting page, for example, display the preview effect of one or more selected areas of the original image 201 in the second page area 21 of the background image setting page.

S202. Displaying the background image setting page, and displaying the original image on the background image setting page.

S203. When a preview instruction is received, displaying, in the background image preview page, a background image preview effect of the preset page if the first selected area of the original image is used as the background image of the preset page.

The preview instruction can be an instruction that instructs the first terminal to display a preview effect of a selected area in the original image, which can be generated if a preset condition is met. For example, it can be generated automatically when a user triggers a preview control in the background image setting page or when a time period during which no trigger operation is received since a trigger page is displayed reaches a preset duration (such as $2s$ or $3s$, etc.). The background image preview page can be a page that displays the preview effect of the selected area in the original image.

Exemplarily, as shown in FIG. 4, the first terminal can display the original image 201 imported or selected by the user on a device page, and display selecting boxes 202 corresponding to different terminals (such as web page terminal, Pad terminal and mobile phone terminal) on the upper layer of the original image 201 to identify selected areas in the original image 201 corresponding to different terminals. And, when the current condition meets a preset condition, the current page is switched from the background image setting page to the background image preview page, and the preview effect of the selected area of the original page 201 is displayed in the background image preview page, for example, the preview effect of one or more selected areas of the original image 201 is displayed in the background image preview page, as shown in FIG. 5 (the figure takes displaying a preview effect of one selected area in the background image preview page as an example).

In the above implementation, when the background image setting page is displayed, the first terminal can switch the current page from the background image setting page to the background image preview page and display the preview effect of the selected area of the original image on the background image preview page for the user to view, when detecting that a user triggers a preview control in the background image setting page or when a time period during which a user's trigger operation is not detected in the background image setting page reaches a preset duration. And, when displaying the background image preview page, the first terminal can switch the current page from the background image preview page to the background image setting page for the user to adjust the original image or the selected area of the original image, when detecting that a user triggers a setting control in the background image preview page, or when detecting that the user triggers a non-control area in the background image preview page (i.e., an area in the background image preview page with no control displayed) or an area for displaying the preview effect.

When the user does not import the original image, the first terminal can also display the original background image preview effect of the preset page in the first page area of the background image setting page or the background image preview page, for example, display the preview effect if the original background image that has been set in the preset page before the current moment is displayed on the second terminal. Here, the original background image can be a background image configured by the system by default or a background image set by the user.

S204. Receiving a background image generation operation.

S205. In response to the background image generation operation, cropping the original image based on the first selected area to obtain a background image if the preset page is displayed on the second terminal; and cropping the original image based on the second selected area to obtain a background image if the preset page is displayed on the first terminal.

In this embodiment, when receiving the image generation operation, the first terminal can generate a background image if the preview page is displayed on itself and a background image if the preview page is displayed on the second terminal.

When receiving the image generation operation, the first terminal can crop the original image based on the first selected area (that is, crop to obtain the first selected area in the original image) to obtain the background image if the preset page is displayed on the second terminal; and crop the original image based on the second selected area (that is, crop to obtain the second selected area in the original image) to obtain the background image if the preset page is displayed on the first terminal.

In one implementation, the background image generation method provided in this embodiment can further comprise: receiving a preview effect switching operation for a target terminal, the target terminal including the first terminal; in response to the preview effect switching operation, displaying a preview effect if the background image of the preset page is displayed in the target terminal if a selected area in the original image corresponding to the target terminal is used as the background image of the preset page, wherein the selected area corresponding to the target terminal includes the first selected area and/or the second selected area.

The preview effect switching operation can be an operation to switch the preview effect displayed on the first terminal, such as an operation to trigger terminal identification information of a terminal. Accordingly, the target terminal can be a terminal corresponding to the terminal identification information on which the trigger operation is acted. The selected area corresponding to the target terminal is a selected area of a terminal corresponding to the target terminal in the original image.

Figure 3:
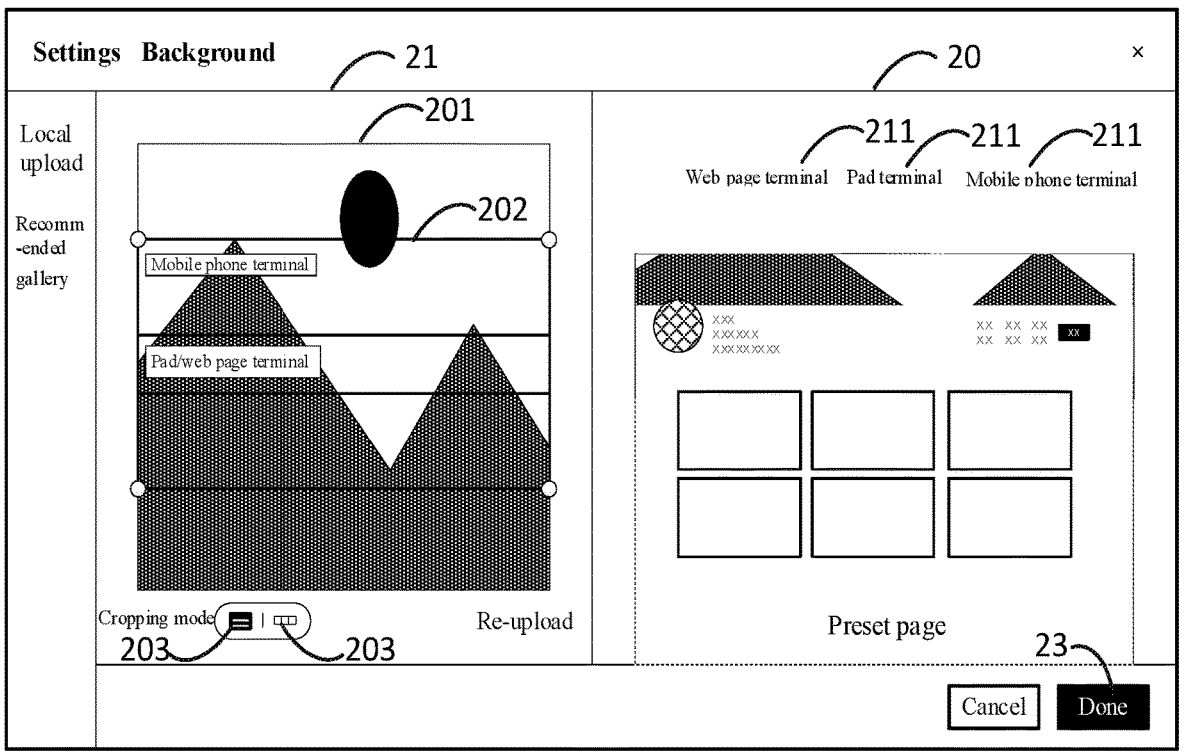
FIG. 3 is a schematic diagram of another background image setting page provided by an embodiment of the present disclosure.

Exemplarily, as shown in FIG. 2, FIG. 3 and FIG. 5, the first terminal can display, in a first page area 20 in a background image setting page or in a background image preview page, a preview effect of a background image if a preset page (that is, a selected area corresponding to the second terminal) is displayed on the second terminal and terminal identifications 211 corresponding to multiple terminals, if a selected area corresponding to the second terminal is used as the background image of the preset page, and can adjust a display state of the terminal identification 211 of the second terminal to a selected state. Therefore, when a user wants to view a preview effect of other terminals (such as the first terminal or other second terminals), the user can trigger the terminal identification 211 of that terminal. Accordingly, when the first terminal detects that the user triggers the terminal identification 211 of a terminal, it can switch the preview effect displayed in the first page area 20 or the background image preview page to a preview effect of a background image if a preset page is displayed on that terminal when a selected area corresponding to that terminal is used as the background image of the preset page, and can adjust the display state of the terminal identification 211 of the terminal to the selected state.

In addition, when the terminal identification of a terminal is in the selected state, the first terminal can also highlight the selected area corresponding to the terminal in the original image, so that the user can confirm the selected area corresponding to the preview effect presented in the first page area of the background image setting page or in the background image preview page.

In one implementation, the background image generation method provided in this embodiment can further include: receiving a selected area adjustment operation for the original image; and, in response to the selected area adjustment operation, adjusting the position and/or the size of the selected area in the original image, wherein the selected area in the original image includes the first selected area and/or the second selected area.

The adjustment operation can be understood as an operation to adjust a selected area, such as an operation to adjust the position of the selected area in the original image and/or adjust the size of the selected area, etc., and the operation can be an operation to drag, expand or shrink a selecting box located on the upper layer of the original image and/or the original image.

Exemplarily, the first terminal can display the original image and display a selecting box on the upper layer of the original image. Therefore, when the user wants to adjust the selected area in the original image, the user can drag, expand or shrink the selecting box (for example, for a case where the first terminal is a computer terminal), or drag, expand or shrink the original image (for example, for a case where the first terminal is a Pad terminal or a mobile phone terminal). Accordingly, when detecting a user's operation of dragging, expanding or shrinking the selecting box or the original image, the first terminal can determine that an adjustment operation for the selected area in the original image has been received, and in response to the adjustment operation, adjust the position and/or the size of the selected area/the original image, and use the area of the adjusted original image within the selecting box as a new selected area based on the adjusted selecting box/original image, and can display a preview effect of the new selected area.

In this embodiment, the first terminal can adjust the first selected area and the second selected area synchronously or asynchronously, or, proportionally or disproportionally. For example, it can adjust the first selected area and the second selected area synchronously and proportionally, and at this time, the adjusting the position and/or the size of the selected area in the original image can comprise: adjusting the position of the first selected area and the position of the second selected area synchronously; and/or, adjusting the size of the first selected area and the size of the second selected area proportionally.

Exemplarily, when the first terminal receives an operation to adjust the position of a selected area, for example, when receiving an operation to drag any selecting box or the original image, the first terminal can control multiple selecting boxes to move synchronously, or control the original image to move, and determine the area located within multiple selecting boxes in the original image after the move as respective selected area, for example, determine the area located within a first selecting box corresponding to a first selected area in the original image as a first selected area, determine the area located within a second selecting box corresponding to a second selected area in the original image as a second selected area; and when receiving an operation to expand or shrink any selecting box or the original image, the first terminal can control multiple selecting boxes to be expanded or shrinked proportionally, or control the original image to be expanded or shrinked, and determine the area located within multiple selecting boxes in the original image after expanding or shrinking as respective selected area.

In one implementation, the background image generation method provided in this embodiment can further include: receiving a nesting relationship change operation; and in response to the nesting relationship change operation, changing the nesting relationship between the first selected area and the second selected area.

The nesting relationship changing operation can be an operation that changes the nesting relationship between a first selected area and a second selected area, such as an operation that triggers respective nesting relationship control. The nesting relationship can be understood as the relative positional relationship between the first selected area and the second selected area, such as the first selected area being nested inside the second selected area or the second selected area being nested inside the first selected area, etc.

Figure 7:
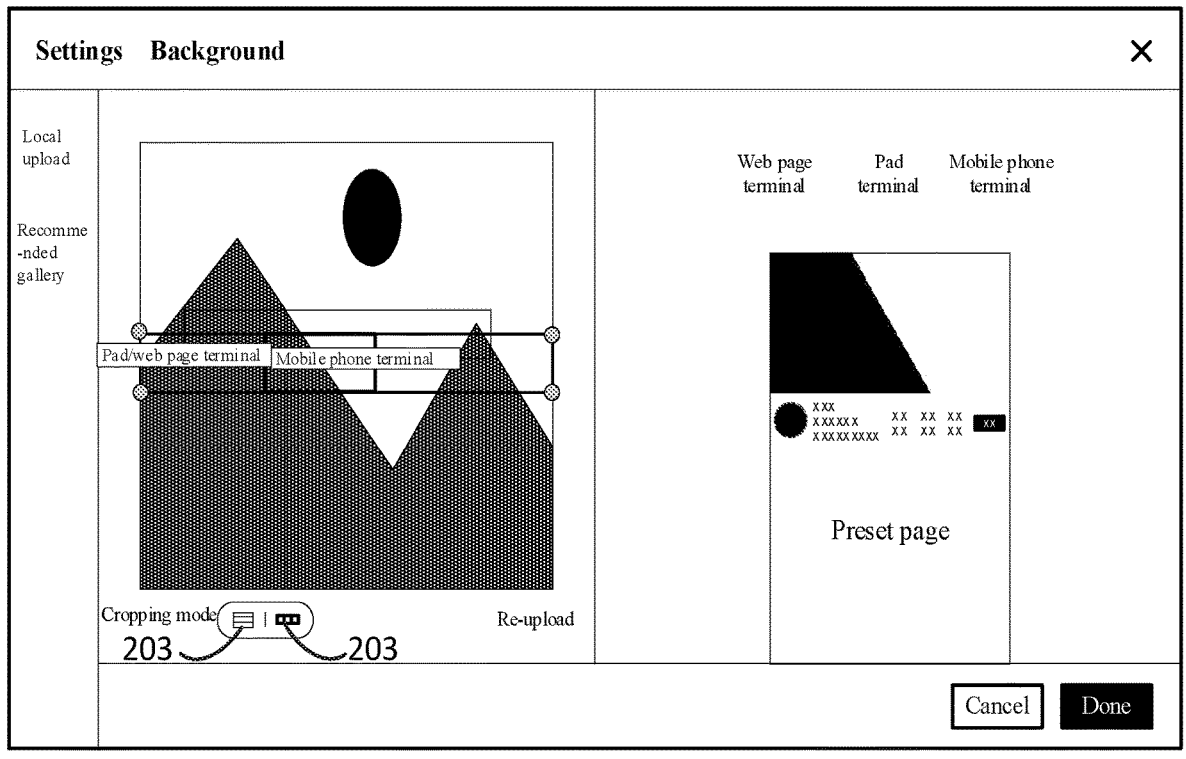
FIG. 7 is a schematic diagram of a nesting relationship between selected areas provided by an embodiment of the present disclosure.

Taking the background image setting page shown in FIG. 2 as an example (only nesting relationship controls 203 corresponding to two nesting relationships are shown in the figure), the background image setting page can display nesting relationship controls 203 corresponding to different nesting relationships, and can display a first selected area and a second selected area according to a preset default nesting relationship after a user imports or selects an original image 201. Therefore, when the user wants to change the nesting relationship between the first selected area and the second selected area, the user can trigger the nesting relationship control 203 corresponding to the nesting relationship to which the user wants to change (for example, trigger the nesting relationship control 203 on the right). Accordingly, when the first terminal detects that the user triggers a nesting relationship control 203 displayed on the background image setting page, the first terminal can display a selecting box 202 corresponding to the nesting relationship on the upper layer of the original image, as shown in FIG. 7, to change the nesting relationship between the first selected area and the second selected area in the original image.

The background image generation method provided by this embodiment can display preview effects if an original image and a first selected area or a second selected area of the original image are displayed as background images of a preset page in respective terminal using different ways, generate a background image if the preset page is displayed on the second terminal based on the first selected area, and generate a background image if the preset page is displayed on the first terminal based on the second selected area, enabling the user to implement the generation of background images for the present terminal and other terminals, simplify the background image setting process and improve the user experience.

Figure 8:
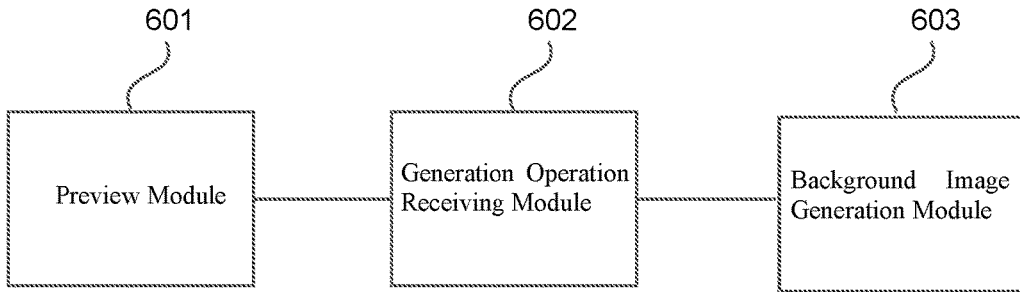
FIG. 8 is a structural block diagram of a background image generation apparatus provided by an embodiment of the present disclosure.

FIG. 8 is a structural block diagram of a background image generation apparatus provided by an embodiment of the present disclosure. The apparatus can be implemented by software and/or hardware, and can be configured in an electronic device. For example, the apparatus can be configured in a mobile phone, a tablet, or a computer, and can generate a background image by executing a background image generation method. As shown in FIG. 8, the background image generation apparatus provided by this embodiment can include: a preview module 601, a generation operation receiving module 602, and a background image generation module 603, wherein the preview module 601 is configured to display a background image preview effect of a preset page, wherein the background image preview effect is displayed on a first terminal, and the background image preview effect is a preview effect for displaying a background image on a second terminal; the generation operation receiving module 602 is configured to receive a background image generation operation; and the background image generation module 603 is configured to generate a background image if the preset page is displayed on the second terminal in response to the background image generation operation.

The background image generation apparatus provided by this embodiment displays a background image preview effect of a preset page through the preview module 601, wherein the background image preview effect is displayed on the first terminal, and the background image preview effect is the preview effect if the background image is displayed on the second terminal; receives a background image generation operation through the generation operation receiving module 602; and in response to the background image generation operation, generates, through the background image generation module 603, a background image if the preset page is displayed on the second terminal. By adopting the above technical solution, this embodiment can view, in the first terminal, the preview effect of the background image if the preset page is displayed on the second terminal, and generate the background image if the preset page is displayed on the second terminal, which can simplify the background image setting process and improve the display effect of the background image.

In the above solution, the preview module 601 can be configured to display a background image preview effect of a preset page if a first selected area of an original image is used as the background image of the preset page.

In the above solution, the original image can also include a second selected area, and the background image generation module 603 can be configured to: crop the original image based on the first selected area to obtain a background image if the preset page is displayed on the second terminal; and, crop the original image based on the second selected area to obtain a background image if the preset page is displayed on the first terminal.

In the above solution, the background image generation apparatus provided by this embodiment can further include: a switching operation receiving module configured to receive a preview effect switching operation for a target terminal, wherein the target terminal includes the first terminal; an effect switching module configured to, in response to the preview effect switching operation, display a preview effect if the background image of the preset page is displayed in the target terminal when a selected area corresponding to the target terminal in the original image is used as the background image of the preset page, wherein the selected area corresponding to the target terminal includes the first selected area and/or the second selected area.

In the above solution, the preview module 601 can be configured to: display a background image setting page, and display, in the first page area of the background image setting page, a background image preview effect of the preset page if the first selected area of the original image is used as the background image of the preset page, wherein the background image setting page also includes a second page area, and the original image is displayed in the second page area.

In the above solution, the preview module 601 can be configured to: when receiving a preview instruction, display, in the background image preview page, a background image preview effect of the preset page if a first selected area of the original image is used as the background image of the preset page; the background image generation apparatus provided by this embodiment can further include: an image display module configured to display a background image setting page and display the original image in the background image setting page.

In the above solution, the background image generation apparatus provided by this embodiment can further include: an adjustment operation receiving module configured to receive a selected area adjustment operation for the original image; an area adjustment module configured to, in response to the selected area adjustment operation, adjust a position and/or a size of the selected area in the original image, wherein the selected area of the original image includes the first selected area and/or the second selected area.

In the above solution, the area adjustment module can be configured to: adjust the position of the first selected area and the position of the second selected area synchronously; and/or adjust the size of the first selected area and the size of the second selected area proportionally.

In the above solution, the background image generation apparatus provided by this embodiment can further comprise: a change operation receiving module configured to receive a nesting relationship changing operation; a relationship changing module configured to, in response to the nesting relationship changing operation, change the nesting relationship between the first selected area and the second selected area.

The background image generation apparatus provided by the embodiment of the present disclosure can execute the background image generation method provided by any embodiment of the present disclosure, and has corresponding functional modules and effects for executing the background image generation method. Technical details that are not described in detail in this embodiment can refer to the background image generation method provided by any embodiment of the present disclosure.

Figure 9:
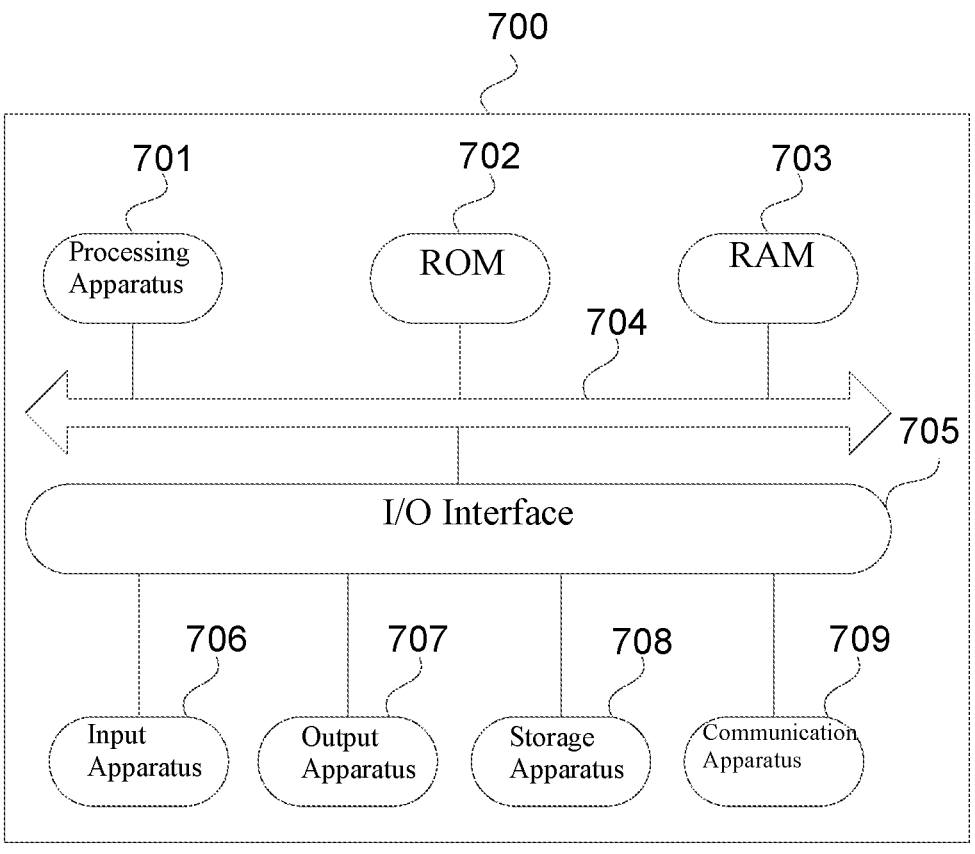
FIG. 9 is a schematic structural diagram of an electronic device provided by an embodiment of the present disclosure.

Referring now to FIG. 9, a schematic structural diagram of an electronic device (such as a mobile phone, a tablet or a computer) 700 suitable for implementing embodiments of the present disclosure is shown. The terminal device 700 in the embodiments of the present disclosure can include, but not limited to, a mobile terminal such as a mobile phone, a laptop, a digital broadcast receiver, a Personal Digital Assistant (PDA), a Pad, a Portable Media Player (PMP), and an on-vehicle terminal (such as an on-vehicle navigation terminal) etc., and a fixed terminal such as a digital television (TV), a desktop computer, etc. The electronic device 700 shown in FIG. 9 is only one example and should not bring any limitations to the functions and scope of usages of the embodiments of the present disclosure.

As shown in FIG. 9, the electronic device 700 can include a processing apparatus (for example a central processing unit, a graphics processor, etc.) 701, which can perform various appropriate actions and processes according to a program stored in a Read-Only Memory (ROM) 702 or a program loaded from a storage apparatus 708 into a Random Access Memory (RAM) 703. In the RAM 703, various programs and data required for the operation of the electronic device 700 are also stored. The processing apparatus 701, the ROM 702 and the RAM 703 are connected to each other via a bus 704. An Input/Output (I/O) interface 705 is also connected to the bus 704.

Generally, the following apparatus can be connected to the I/O interface 705: an input apparatus 706 including, for example, a touch screen, a touchpad, a keyboard, a mouse, a camera, a microphone, an accelerometer, a gyroscope, etc.;

an output apparatus 707 including, for example, a Liquid Crystal Display (LCD), a speaker, a vibrator, etc.; a storage apparatus 706 including, for example, a magnetic tape, a hard disk, etc.; and a communication apparatus 709. The communication apparatus 709 can allow the electronic device 700 to perform wireless or wired communication with other devices to exchange data. Although FIG. 9 shows an electronic device 700 with various apparatus, it is not required to implement or have all of the illustrated apparatuses. It can alternatively be implemented or provided with more or fewer apparatus.

According to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program can be downloaded and installed from the network through the communication apparatus 709, or installed from the storage apparatus 708, or installed from the ROM 702. When the computer program is executed by the processing apparatus 701, the above functions defined in the methods of the embodiments of the present disclosure are executed.

The aforementioned computer-readable medium in the present disclosure can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Examples of computer-readable storage media can include, but is not limited to: an electrical connection with one or more wires, a portable computer disk, a hard disk, a RAM, a ROM, an Erasable Programmable Read-Only Memory (EPROM or flash memory), an optical fiber, a portable Compact Disk Read-Only Memory (CD-ROM), an optical storage device, a magnetic storage device, or any suitable combination thereof. In the present disclosure, a computer-readable storage medium can be any tangible medium that contains or stores a program, and the program can be used by or in combination with an instruction execution system, apparatus, or device. In the present disclosure, a computer-readable signal medium can include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium can also be any computer-readable medium other than the computer-readable storage medium. The computer-readable signal medium can send, propagate, or transmit the program for use by or in combination with the instruction execution system, apparatus, or device. The program code contained on the computer-readable medium can be transmitted by any suitable medium, including but not limited to: wire, optical cable, Radio Frequency (RF), etc., or any suitable combination thereof.

In some embodiments, the client and server can communicate using any currently known or future developed network protocol, such as HyperText Transfer Protocol (HTTP), and can interconnect with digital data communication (e.g., communication network) in any form or medium. Examples of communication networks include Local Area Networks (LANs), Wide Area Networks (WANs), international networks (e.g., the Internet), and end-to-end networks (e.g., ad hoc end-to-end networks), as well as any currently known or future developed networks.

The above computer-readable medium can be included in the above electronic device; or it can exist independently without being assembled into the electronic device.

The above computer-readable medium carries one or more programs, which, when executed by the electronic device, cause the electronic device to: display a background image preview effect of a preset page, wherein the background image preview effect is displayed on a first terminal, and the background image preview effect is a preview effect for displaying a background image on a second terminal; receive a background image generation operation; and in response to the background image generation operation, generate a background image if the preset page is displayed on the second terminal.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network including LAN or WAN, or it can be connected to an external computer (for example, connected by Internet using an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram can represent a module, program segment, or part of code, which contains one or more executable instructions for realizing specified logic functions. It should also be noted that, in some alternative implementations, functions marked in a block can also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware, wherein the name of the module does not constitute a limitation on the unit itself under one circumstance.

The functions described herein above can be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logic device (CPLD) and so on.

In the context of the present disclosure, a machine-readable medium can be a tangible medium, which can contain or store a program for use by the instruction execution system, apparatus, or device or in combination with the instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. Examples of machine-readable storage media can include an electrical connection based on one or more wires, a portable computer disk, a hard disk, a RAM, a ROM, an EPROM or flash memory, an optical fiber, a CD-ROM, an optical storage device, a magnetic storage device, or any suitable combination thereof.

According to one or more embodiments of the present disclosure, Example 1 provides a background image generation method, comprising:

displaying a background image preview effect of a preset page, wherein the background image preview effect is displayed on a first terminal, and the background image preview effect is a preview effect for displaying a background image on a second terminal;

receiving a background image generation operation;

in response to the background image generation operation, generating a background image if the preset page is displayed on the second terminal.

According to one or more embodiments of the present disclosure, Example 2 according to the method of Example 1, the displaying a background image preview effect of a preset page comprises:

displaying a background image preview effect of the preset page if a first selected area of an original image is used as a background image of the preset page.

According to one or more embodiments of the present disclosure, Example 3 according to the method of Example 2, the original image further includes a second selected area, and the generating a background image if the preset page is displayed on the second terminal comprises:

cropping the original image based on the first selected area to obtain the background image if the preset page is displayed on the second terminal;

the method further comprises:

cropping the original image based on the second selected area to obtain the background image if the preset page is displayed on the first terminal.

According to one or more embodiments of the present disclosure, Example 4 according to the method of Example 3 further comprises:

receiving a preview effect switching operation for a target terminal, the target terminal including the first terminal; and in response to the preview effect switching operation, displaying a preview effect if the background image of the preset page is displayed in the target terminal when a selected area in the original image corresponding to the target terminal is used as the background image of the preset page, wherein the selected area corresponding to the target terminal includes the first selected area and/or the second selected area.

According to one or more embodiments of the present disclosure, Example 5 according to the method of Example 3, the displaying a background image preview effect of the preset page if a first selected area of the original image is used as the background image of the preset page comprises:

displaying a background image setting page, and displaying, in a first page area of the background image setting page, the background image preview effect of the preset page if the first selected area of the original image is used as the background image of the preset page, wherein the background image setting page further includes a second page area, and the original image is displayed in the second page area.

According to one or more embodiments of the present disclosure, Example 6 according to the method of Example 3, the displaying a background image preview effect of the preset page if a first selected area of the original image is used as the background image of the preset page comprises:

when a preview instruction is received, displaying, on a background image preview page, the background image preview effect of the preset page if the first selected area of the original image is used as the background image of the preset page;

the method further comprises:

displaying the background image setting page, and displaying the original image on the background image setting page.

According to one or more embodiments of the present disclosure, Example 7 according to the method of Example 5 or 6, further comprises:

receiving a selected area adjustment operation for the original image;

in response to the selected area adjustment operation, adjusting a position and/or a size of the selected area in the original image, wherein the selected area in the original image includes the first selected area and/or the second selected area.

According to one or more embodiments of the present disclosure, Example 8 according to the method of Example 7, the adjusting the position and/or the size of the selected area in the original image comprises:

adjusting the position of the first selected area and the position of the second selected area synchronously; and/or, adjusting the size of the first selected area and the size of the second selected area proportionally.

According to one or more embodiments of the present disclosure, Example 9 according to the method of Example 5 or 6, further comprises:

receiving a nesting relationship change operation;

in response to the nesting relationship change operation, changing the nesting relationship between the first selected area and the second selected area.

According to one or more embodiments of the present disclosure, Example 10 provides a background image generation apparatus, comprising:

a preview module configured to display a background image preview effect of a preset page, wherein the background image preview effect is displayed on a first terminal, and the background image preview effect is a preview effect for displaying a background image on a second terminal;

a generation operation receiving module configured to receive a background image generation operation;

a background image generation module configured to generate a background image if the preset page is displayed on the second terminal in response to the background image generation operation.

According to one or more embodiments of the present disclosure, Example 11 provides an electronic device, comprising:

one or more processors;

a memory configured to store one or more programs;

when executed by the one or more processors, the one or more programs cause the one or more processors to implement the background image generation method as described in any one of Examples 1-9.

According to one or more embodiments of the present disclosure, Example 12 provides a computer-readable storage medium having a computer program stored thereon, which, when executed by a processor, implements the background image generation method as described in any one of Examples 1-9.

In addition, although various operations are depicted in a specific order, this should not be understood as requiring these operations to be performed in the specific order shown or performed in a sequential order. Under certain circumstances, multitasking and parallel processing can be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

What is claimed is:

1. A background image generation method, comprising:

displaying a preview window and a plurality of identifiers on a background setting page on a first terminal of a first type, wherein the plurality of identifiers comprises a first identifier and a second identifier, and the first identifier corresponds to the first type of terminal, the second identifier corresponds to a second type of terminal;

displaying a first preview effect in the preview window, wherein the first preview effect shows a preview of an image being used as a background image on the first terminal; and switching to displaying a second preview effect in the preview window in response to receiving a selection of the second identifier, wherein the second preview effect shows a preview of the image or another image being used as a background image on the second type of terminal.

2. The method according to claim 1, wherein the displaying the first preview effect comprises: displaying a preview of a first selected area of an original image being used as the background image of a preset page on the first terminal, and wherein displaying the second preview effect comprises displaying a preview of a second selected area of the original image being used as the background image of the preset page on the second type of terminal.

3. The method according to claim 2, the method further comprising:

generating the background image if the preset page is displayed on the first terminal based on cropping the original image based on the first selected area; or generating the background image if the present page is displayed on the second type of terminal based on cropping the original image based on the second selected area.

4. The method according to claim 3, wherein the displaying a preview of the first selected area of the original image being used as the background image of the preset page on the first terminal comprises:

displaying, in a first page area of the background setting page, the preview of the first selected area of the original image being used as the background image of the preset page on the first terminal, wherein the background setting page further includes a second page area, and the original image is displayed in the second page area.

5. The method according to claim 4, further comprising:
receiving a selected area adjustment operation for the original image; and
in response to the selected area adjustment operation, adjusting at least one of the position or size of the selected area in the original image, wherein the selected area in the original image includes at least one of the first selected area or the second selected area.

6. The method according to claim 5, wherein the adjusting at least one of the position or size of the selected area in the original image comprises at least one of:
adjusting a position of the first selected area and a position of the second selected area synchronously; or
adjusting a size of the first selected area and a size of the second selected area proportionally.

7. The method according to claim 4, further comprising:
receiving a nesting relationship change operation; and
in response to the nesting relationship change operation, changing the nesting relationship between the first selected area and the second selected area.

8. The method according to claim 3,
the method further comprising:
displaying the original image on the background setting page.

9. An electronic device, comprising:
at least one processor;
a memory configured to store at least one program;
when executed by the at least one processor, the at least one program causes the at least one processor to implement operations comprising:
displaying a preview window and a plurality of identifiers on a background setting page on a first terminal of a first type, wherein the plurality of identifiers comprises a first identifier and a second identifier, and the first identifier corresponds to the first type of terminal, the second identifier corresponds to a second type of terminal;
displaying a first preview effect in the preview window, wherein the first preview effect shows a preview of an image being used as a background image on the first terminal; and
switching to displaying a second preview effect in the preview window in response to receiving a selection of the second identifier, wherein the second preview effect shows a preview of the image or another image being used as a background image on the second type of terminal.

10. The electronic device according to claim 9, wherein the displaying the first preview effect comprises: displaying a preview of a first selected area of an original image being used as the background image of a preset page on the first terminal, and
wherein displaying the second preview effect comprises
displaying a preview of a second selected area of the original image being used as the background image of the preset page on the second type of terminal.

11. The electronic device according to claim 10, the operations further comprising:
generating the background image if the preset page is displayed on the first terminal based on cropping the original image based on the first selected area; or generating the background image if the present page is displayed on the second type of terminal based on cropping the original image based on the second selected area.

12. The electronic device according to claim 11, wherein the displaying a preview of the first selected area of the original image being used as the background image of the preset page on the first terminal comprises:
displaying, in a first page area of the background setting page, the preview of the first selected area of the original image being used as the background image of the preset page on the first terminal, wherein the background setting page further includes a second page area, and the original image is displayed in the second page area.

13. The electronic device according to claim 11,
the method further comprising:
displaying the original image on the background image setting page.

14. A non-transitory computer-readable storage medium having a computer program stored thereon, wherein the program, when it is executed by a processor, implements operations comprising:
displaying a preview window and a plurality of identifiers on a background setting page on a first terminal of a first type, wherein the plurality of identifiers comprises a first identifier and a second identifier, and the first identifier corresponds to the first type of terminal, the second identifier corresponds to a second type of terminal;
displaying a first preview effect in the preview window, wherein the first preview effect shows a preview of an image being used as a background image on the first terminal; and
switching to displaying a second preview effect in the preview window in response to receiving a selection of the second identifier, wherein the second preview effect shows a preview of the image or another image being used as a background image on the second type of terminal.

15. The non-transitory computer-readable storage medium according to claim 14, wherein the displaying the first preview effect comprises: displaying a preview of a first selected area of an original image being used as the background image of a preset page on the first terminal, and
wherein displaying the second preview effect comprises
displaying a preview of a second selected area of the original image being used as the background image of the preset page on the second type of terminal.

16. The non-transitory computer-readable storage medium according to claim 15, the operations further comprising:
generating the background image if the preset page is displayed on the first terminal based on cropping the original image based on the first selected area; or
generating the background image if the present page is displayed on the second type of terminal based on cropping the original image based on the second selected area.

17. The non-transitory computer-readable storage medium according to claim 16, wherein the displaying a preview of the first selected area of the original image being used as the background image of the preset page on the first terminal comprises:
displaying, in a first page area of the background setting page, the preview of the first selected area of the original image being used as the background image of the preset page on the first terminal, wherein the background setting page further includes a second page area, and the original image is displayed in the second page area.

\* \* \* \* \*